United States Patent [19]

Meshberg

[11] Patent Number: 5,593,064
[45] Date of Patent: Jan. 14, 1997

[54] PROMOTIONAL DISPENSER AND METHOD FOR ITS USE

[76] Inventor: Philip Meshberg, 2770 S. Ocean Blvd. Apt. 602, Palm Beach, Fla. 33480

[21] Appl. No.: 163,787

[22] Filed: Dec. 9, 1993

[51] Int. Cl.⁶ .............................. B05B 11/00; B67D 5/32
[52] U.S. Cl. .................... 222/39; 53/470; 53/471; 53/485; 53/133.2; 53/300; 222/153.11; 222/321.1; 222/321.9; 222/340
[58] Field of Search ........................... 222/1, 340, 321.1, 222/321.7, 321.9, 153.11, 153.13, 182, 385, 384, 402.11, 39; 53/79, 133.2, 300, 470, 471, 485, 486, 489

[56] References Cited

U.S. PATENT DOCUMENTS

| | | | |
|---|---|---|---|
| 2,799,435 | 7/1957 | Abplanalp | 222/394 |
| 2,835,418 | 5/1958 | Manetti | 222/402.13 X |
| 3,161,330 | 12/1964 | Sagarin et al. | 53/470 X |
| 3,333,743 | 8/1967 | Meyers | 222/402.1 |
| 3,848,778 | 11/1974 | Meshberg | 222/402.11 |
| 4,183,449 | 1/1980 | Blake | 222/340 X |
| 4,277,001 | 7/1981 | Nozawa | 222/321 |
| 4,826,031 | 5/1989 | Ruscitti | 222/321.9 X |
| 4,854,484 | 8/1989 | Gentile et al. | 222/385 X |
| 4,875,604 | 10/1989 | Czech | 222/340 X |
| 4,993,606 | 2/1991 | Bolen, Jr. et al. | 222/546 |
| 5,024,355 | 6/1991 | Jouillat et al. | 222/340 X |
| 5,085,350 | 2/1992 | Sugita | 222/260 |
| 5,104,004 | 4/1992 | von Schuckmann | 222/320 X |
| 5,123,573 | 6/1992 | Kücherer | 222/382 X |
| 5,158,211 | 10/1992 | Meshberg | 222/153.13 |
| 5,263,606 | 11/1993 | Dutt et al. | 53/DIG. 2 |

FOREIGN PATENT DOCUMENTS

| | | |
|---|---|---|
| 251939 | 7/1987 | European Pat. Off. . |
| 340332 | 11/1989 | European Pat. Off. ............ 222/321.7 |
| 2522283 | 9/1983 | France . |
| 2646408 | 10/1990 | France . |
| 3147749 | 6/1983 | Germany . |
| 2013774 | 8/1974 | United Kingdom . |

OTHER PUBLICATIONS

Translation of French Patent No. 2 646 408.
Translation of European Patent Office Patent No. 0 251 939.

*Primary Examiner*—Kevin P. Shaver
*Attorney, Agent, or Firm*—Kenyon & Kenyon

[57] ABSTRACT

A promotional dispensing package which is easily shipped, filled and assembled is disclosed. The package includes a retaining opening into which a modular pump is snap-fit by inserting the modular pump through an open end of the package. The package also includes a upstanding wall portion, which provides a dispensing actuator locking and sealing mechanism, as well as a tamper-evident tab. The package and pump are assembled at a production site, and are thereafter shipped to a filling site with a bottom portion. The package is filled through the open bottom end, and then the bottom portion is sealingly affixed to the package. Accordingly, the device of the present invention can be filled and finally assembled with a minimal number of steps, and is therefore particularly suited for quick-turnaround marketing.

15 Claims, 6 Drawing Sheets

5,593,064

PROMOTIONAL DISPENSER AND METHOD FOR ITS USE

BACKGROUND OF THE INVENTION

1. Field of the Invention

The present invention relates to a complete dispensing package designed to be shipped as an assembled unit to a liquid product marketer, for subsequent filling. The dispensing package is easily filled and bottom sealed with a minimal number of automatic assembly steps. The package of the present invention also includes structure to provide an air seal to the dispensing nozzle and lock the dispensing actuator when it is not in use, and provides a tamper-resistant package.

2. Description of the Related Art

U.S. Pat. No. 5,158,211 discloses a dispensing package including a modular pump which is assembled into a dispensing package using a snap fit, such that the dispensing pump is permanently retained in the package. In the device disclosed in U.S. Pat. No. 5,158,211, the package is filled through an opening at the top of the package. After filling, the pump is attached to the package, either by snap-fitting the pump structure into a retaining opening, or by adding the pump to the package using a conventional screw-cap mounting. Accordingly, in the device of U.S. Pat. No. 5,158,211, the assembled pump structure and the package must be shipped unassembled to a filling and assembly site, where the package is filled and the pump is then assembled to the package. The invention of U.S. Pat. No. 5,158,211 also includes a mechanism for sealing the outlet nozzle when the dispenser is not in use, and a mechanism for making the dispenser tamper-resistant, to thereby prevent placing any foreign substances or liquids into the package after it is sealed, and also to prevent accidental discharge of liquid.

U.S. Pat. No. 5,392,962, issued Feb. 28, 1995, the disclosure of which is incorporated herein by reference, discloses two designs of a pump which is constructed entirely of a plastic material, to make the pump easily recyclable.

SUMMARY OF THE INVENTION

The present invention is a package-dispensing unit combination designed for easy filling and post-filling assembly, and which can be efficiently shipped to a liquid product producer and to a post-filling marketer. The device of the present invention is especially suitable for promotional purposes, since the liquid product producer need only fill the package, snap on a bottom piece to the package, which may be labeled before or after the filling process. The device is thus particularly suited to a quick-turnaround filling and marketing operation, and the assembled and filled packages can be shipped in the same cartons as the unfilled packages were shipped in to the liquid product producer. Accordingly, the present invention eliminates waste in cannon usage, preventing the need to use different cartons for the containers, pumps and filled package.

In the present invention, a modular pump is permanently snap-fit or sonically welded in a leak-proof manner into an opening in a retaining wall in the top of the dispensing package, by inserting the pump into either the open bottom or the open top of the package. An actuator can then be assembled onto the package, which package can include a tamper-evidencing feature, as well structure for locking and sealing the outlet nozzle in a non-dispensing position when not in use. The package can then be shipped to a filling site or to a liquid product producer for filling, final assembly and labelling. At a filling site, the package is inverted, filled from the open bottom, and then a bottom piece is snapped in sealing engagement into the open bottom of the package. The bottom piece can optionally be ultrasonically welded, or sealed with an adhesive, to the package, in such a way that the bottom is permanently retained on the package in a leak-proof manner.

The present invention also includes a mechanism for preventing tampering with the contents of the package after it is sealed, and for preventing accidental discharge of the liquid. This mechanism includes constructing the package so that it is completely sealed after filling. In addition, a snap-off tab is included near the actuator which indicates whether the actuator of the device has been used previously. Also, the device includes a limit stop for preventing actuation of the actuator when locked in a non-dispensing position.

The present invention can be constructed entirely of a plastic material, to make it particularly suitable to recycling. The package can include a spring located between the actuator and the retaining wall. This spring can be constructed of plastic - - - so that the entire package can be recycled as a unit - - - or can be constructed of metal - - - so that the metal spring can be removed from the package easily by simply dislodging the actuator. Both configurations of the present invention make the package easy to recycle.

BRIEF DESCRIPTION OF THE DRAWINGS

Other objects and advantages of the invention will be apparent from he specification and claims, when considered in connection with the attached sheets of drawings, illustrating one form of the invention, wherein like characters represent like parts and in which:

DETAILED DESCRIPTION OF THE INVENTION

Figure 1:
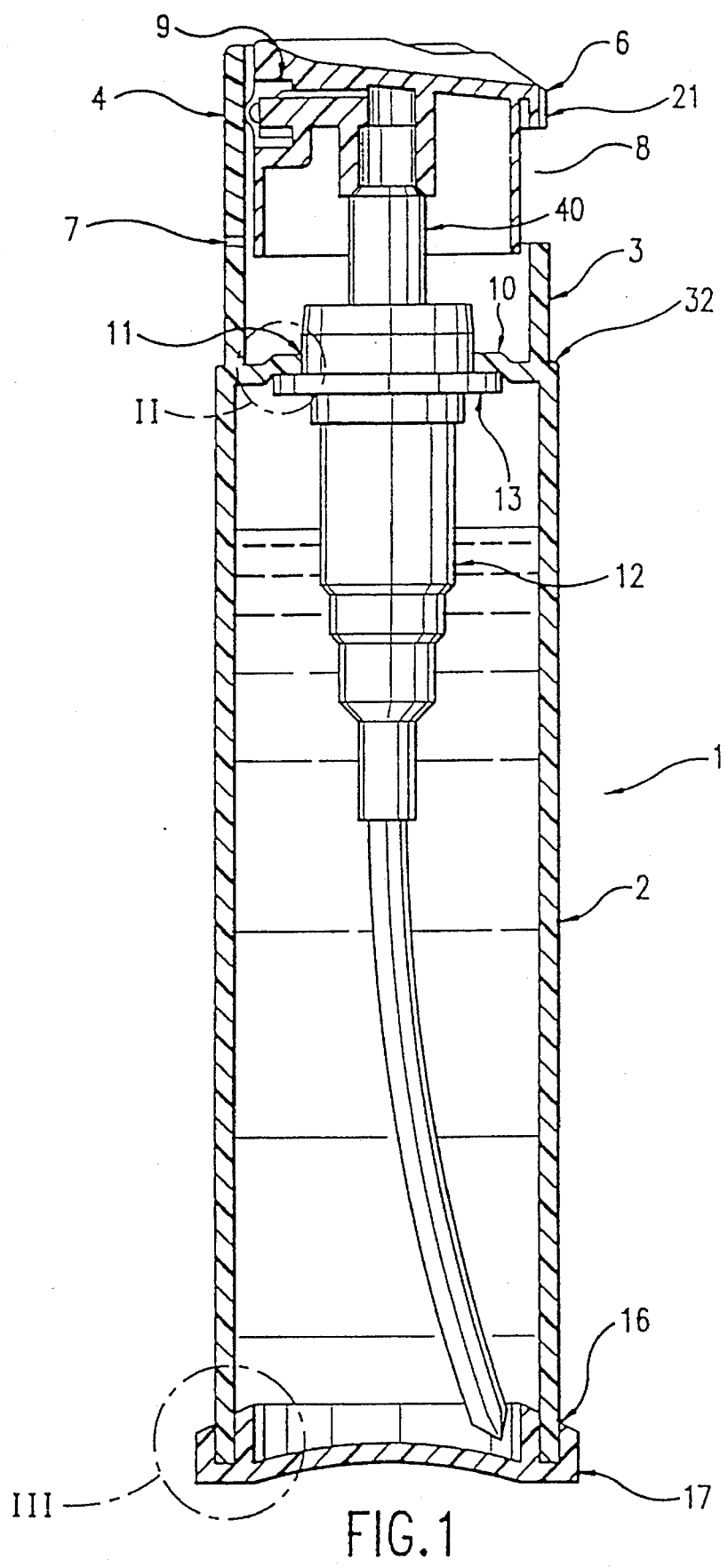
FIG. 1 is a cross-sectional view of the present invention, with the pump inserted and the bottom closure sealed.

The present invention is shown in cross-sectional view, in a sealed condition, in FIG. 1. The present invention includes a package 1 which includes a container portion 2 and an upstanding sleeve portion 3. Upstanding wall portion 3 includes a tamper evident tab portion 4, connected to the upstanding wall portion 3 by a snap-away or tear-away joint 7. Joint 7 is originally molded to integrally connect tab portion 4 to upstanding wall 3, but is designed to be of sufficient thinness so that an end user can ultimately break the joint 7 so that the tab portion 4 can be removed from sleeve portion 3 to uncover nozzle 9 on actuator 6 when it is desired to first use the dispenser 1. Upstanding wall 3 can include a recess 8 intended to facilitate movement of an actuator nozzle 9 within the upstanding wall 3. Although shown as being vertically oriented in FIGS. 1, tab portion 4 could also be oriented in a horizontal direction, with the joint 7 being disposed vertically at one end of the tab 4.

Container portion 2 and upstanding wall 3 are separated by a retaining wall 10 which includes a retaining opening 11 used to secure a pump 12 in the package 1. Pump 12 can be of any conventional design. Pump 12 includes a retention flange 13 for limiting the amount of inward movement of the pump 12 into the container 1 and for providing a surface for an energy director 15 to adhere during a process of sonic or ultrasonic welding. Alternatively, pump could include a retention groove which retains the pump 12 in the package 1 via a snap-fit engagement with retaining wall 10. Pump 12 is inserted into retaining opening 11 through the lower end 16 of container portion 2 or from the upper end including the upstanding wall 3, which is initially open.

Figure 2A:
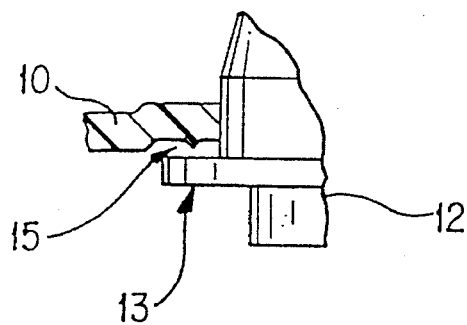
FIGS. 2a and 2b show detail cross-sectional views of the pump and retaining opening of the present invention, showing the energy director feature for sonic welding.
Figure 2B:
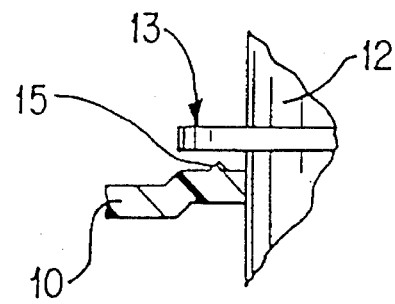

FIGS. 2a and 2b show detail views of the pump 12, pump flange 13, retaining wall 10 and energy director 15. Energy director 15 is a molded ridge which when excited by sonic or ultrasonic vibration of container 2 causes retaining wall 10 and flange 13 to weld together, thereby permanently retaining pump 12 in container portion 2 and sealing the upper end of the container portion 2.

Figure 3A:
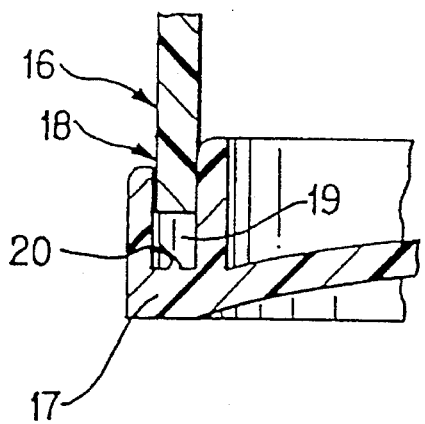
FIGS. 3a and 3b show a detail cross-sectional views of the lower end of the container and the bottom portion which is secured to the container of the present invention, showing the energy director feature.
Figure 3B:
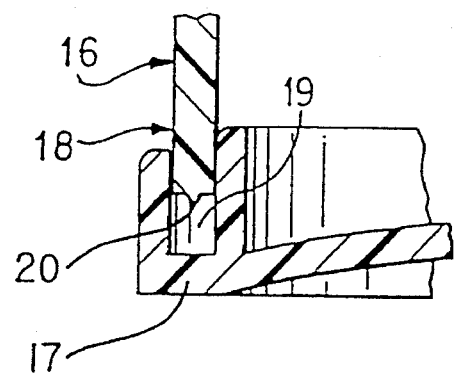

FIGS. 3a and 3b show detail views of the mechanism whereby a bottom portion 17 is attached to lower end 16 of container portion 2. Lower end 16 includes a tapered portion 18 which is shaped so as to fit into a retaining groove 19 in bottom portion 17. Retaining groove 19 or lower end 16 contains, at its lower end, an energy director 20 used to secure and seal bottom portion 17 to the lower end 16 of container portion 2. As with energy director 15, energy director 20 is a molded ridge which when excited by sonic or ultrasonic vibration of container 2 causes lower end 16 and bottom portion 17 to weld together, thereby permanently retaining bottom portion 17 on container portion 2 and sealing the lower end of the container portion 2.

Figure 4:
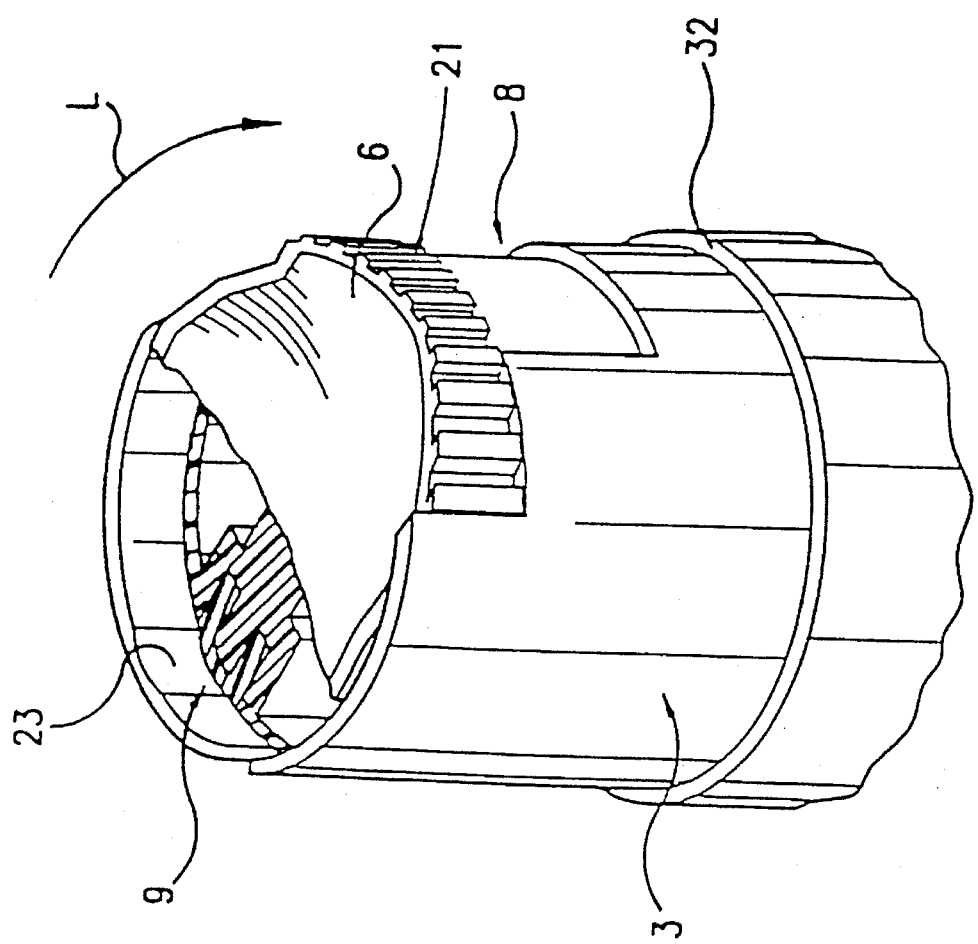
FIGS. 4–6 are perspective views of the actuator and locking mechanisms of the present invention, wherein FIG. 4 includes a partial cross-sectional view.
Figure 6:
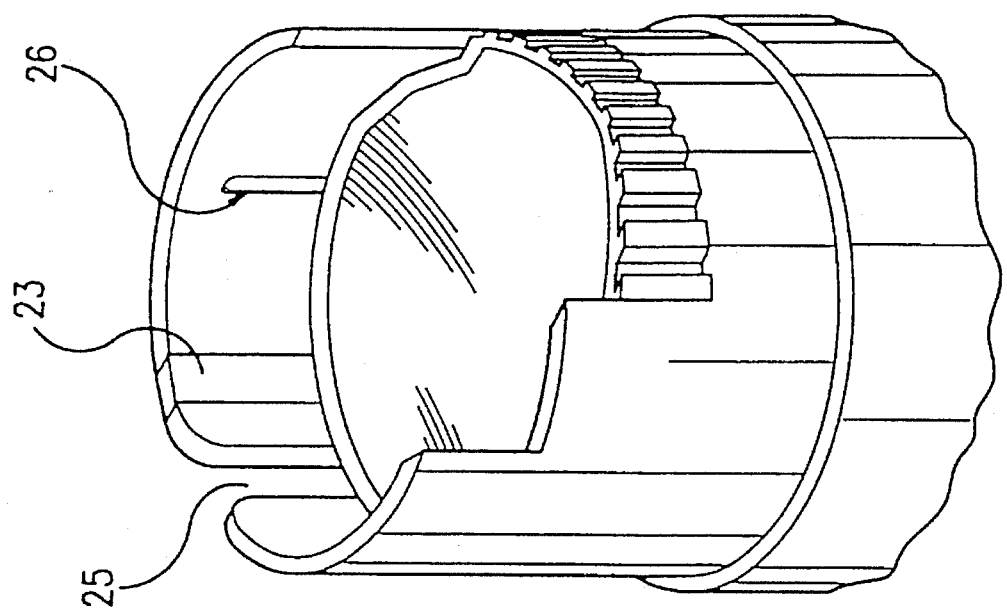
Figure 5:
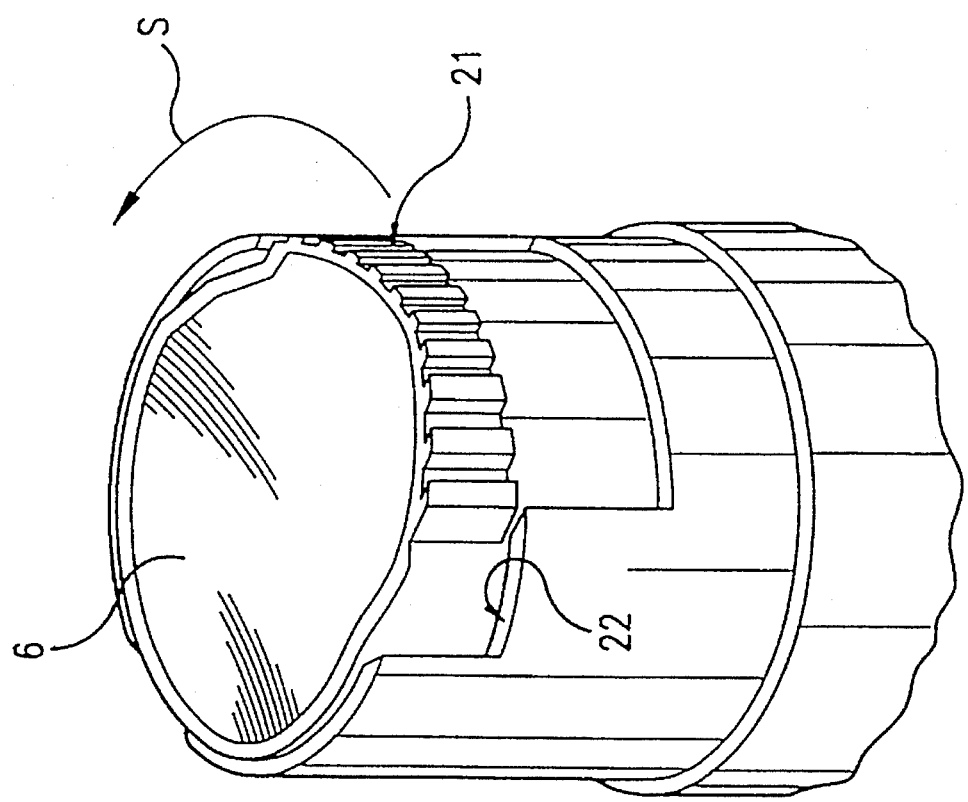

FIGS. 4-6 show the particular features of the actuator 6 of the present device, and the particular locking and retaining features of the upstanding wall 3. In FIG. 4, the forward portion of actuator 6 is shown in cross-sectional view, to show the manner in which the nozzle 9 is sealed in a non-dispensing position. Actuator 6 includes a projecting portion 21 which is used to rotate actuator 6 from a dispensing to a non-dispensing position, and which also acts to prevent downward movement of actuator 6 when actuator 6 is in a non-dispensing position. Upstanding wall 3 includes a limit stop 22 which prevents actuator 6 from moving downward - - - and thus dispensing material from pump 12 - - - via engagement with limit stop 22 (See FIG. 4). The position of the actuator 6 shown in FIG. 4 is the position in which the actuator 6 is kept before the tab 4 is remove from upstanding wall 3. In this position, nozzle 9, which includes a slightly projecting tip, is snapped into a vertical groove 23. Groove 23 acts to retain nozzle 9 and actuator 6 in a non-dispensing position, and also seals the nozzle 9 against the incursion of air into the nozzle 9 orifice. Rotating actuator 6 in the direction indicated by arrow S places the actuator 6 and nozzle 9 into a spraying or dispensing position. In this position (shown in FIGS. 5 and 6) projecting portion 21 in alignment with recess 8. In this position, nozzle 9 is aligned with opening 25 which is formed when tab 4 is removed. As seen by comparing FIGS. 5 and 6, projecting portion 21 travels within recess 8 upon downward actuation of actuator 6, allowing dispensing of material through nozzle 9 via pump 12. Rotating actuator 6 in the direction indicated by arrow L into a locking position, in which nozzle 9 is snapped into groove 23. Indication that nozzle 9 is properly in a non-dispensing position can be provided via a bead 26, which can coact with a bead on the outer circumferential surface of actuator 6, thereby providing an audible "snapping" sound when the beads slide over one another.

Figure 7:
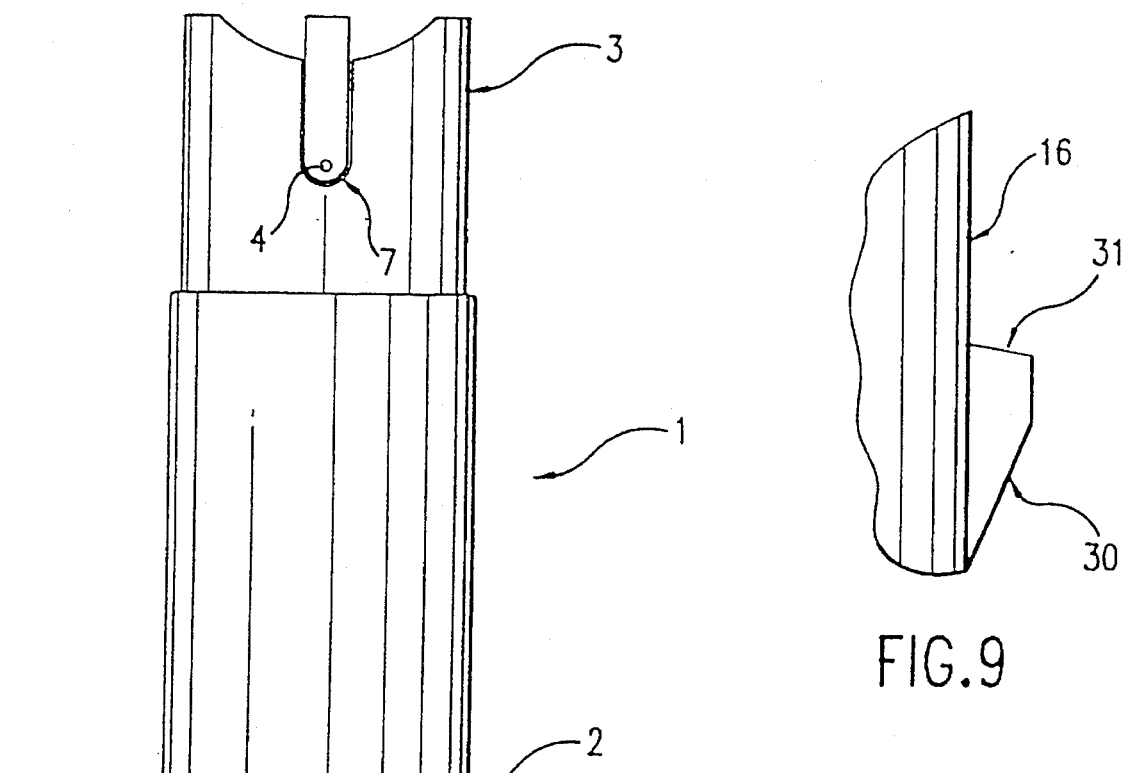
FIG. 7 shows a front view of the container of the present invention, including a second embodiment of the mechanism for attaching the bottom portion to the container.
Figure 9:
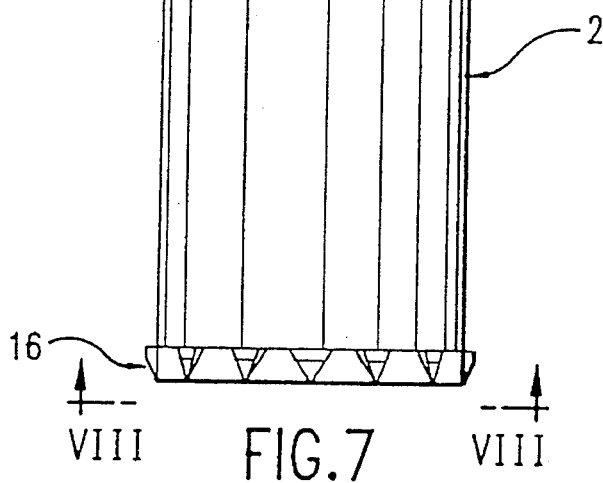
FIG. 9 is a detail view of the retaining mechanism of FIGS. 7–8.
Figure 8:
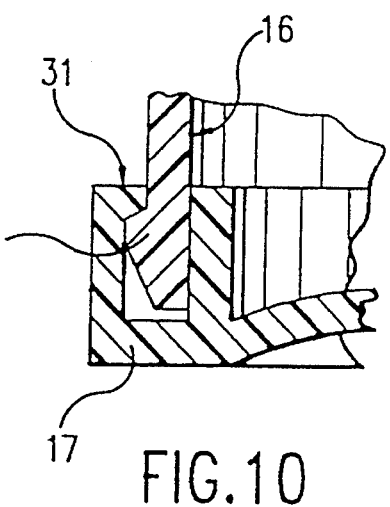
FIG. 8 is a bottom view of the container of FIG. 7.
Figure 10:
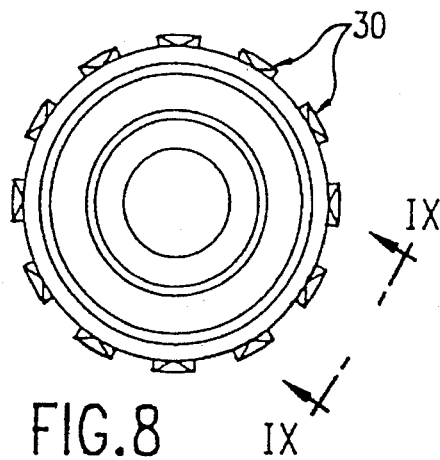
FIG. 10 is a detail cross-sectional view of the lower end of the container of / FIGS. 7–9 and the bottom portion.

FIGS. 7 and 8 show a front and bottom view of the container portion 2 of the present invention, which includes a second embodiment of a mechanism for securing the bottom portion 17 to the container portion 2. Lower end 16 of container portion 2 contains a series of angled tabs 30. Angled tabs 30 are designed to fit into groove 19 in bottom portion 17. Upper end of angled tabs 30 include a generally horizontal surface 31 intended to snap into a horizontally projecting portion 31 on bottom portion 17. Angled tabs 30 and horizontal surface 31 allow bottom portion 17 to be secured horizontally to container portion 2 to thereby ensure good sealing of the bottom portion 17 to the container portion 2 through its entire periphery.

The transition area between container portion 2 and upstanding wall 3 can contain a shoulder 32. Shoulder 32 is useful for an assembly and filling operation of the present invention, as will be described below.

Figure 11:
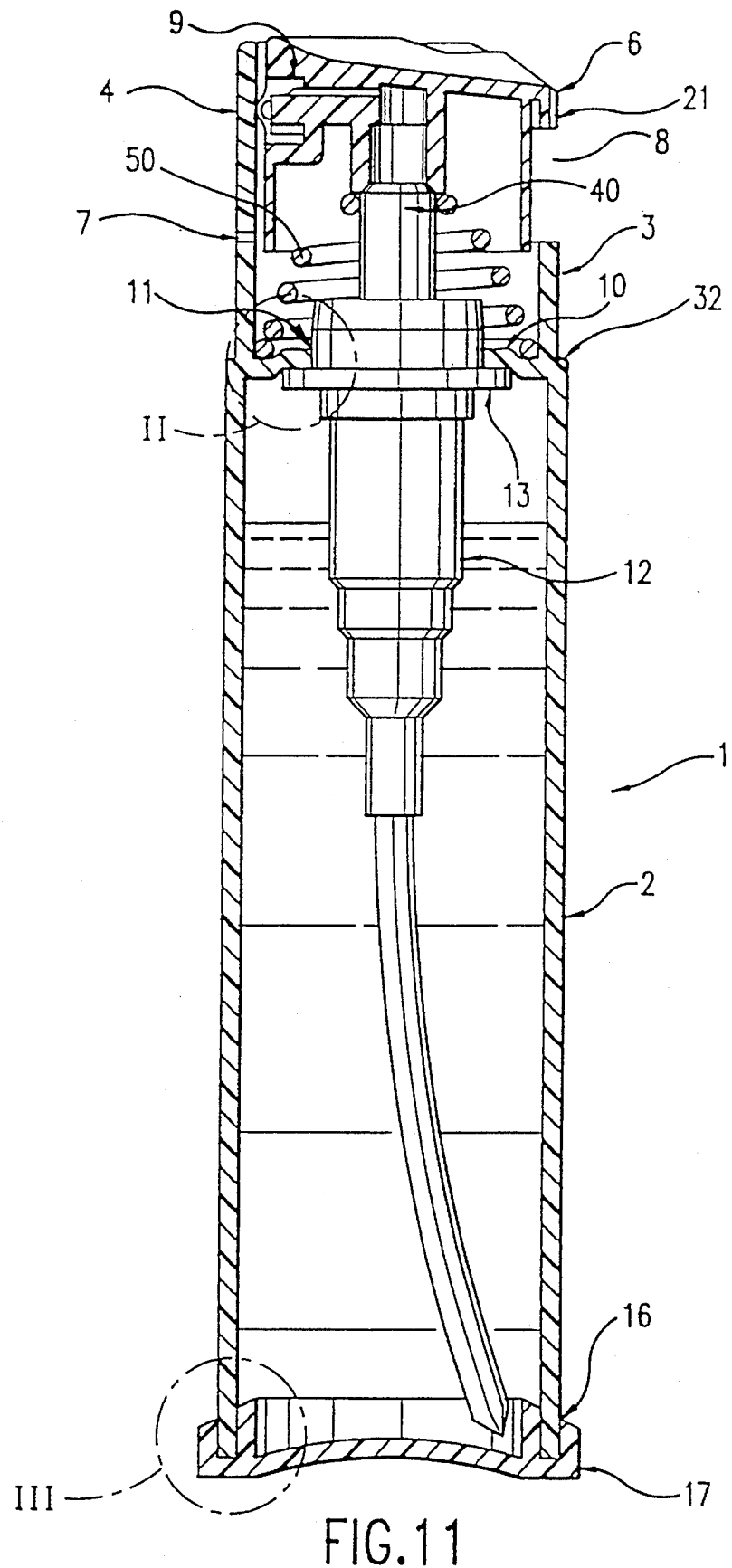
FIG. 11 is a cross-sectional view of an embodiment of the present invention using a spring between the actuator and the container, with the pump inserted and the bottom closure sealed.

As shown in FIG. 11, the pump spring 50 of the present invention can be located between the retaining wall 10 and the actuator 6, as described in U.S. Pat. No. 5,392,962, issued Feb. 28, 1995, the substance of which is incorporated herein by reference. In the configuration of FIG. 11, the spring 50 can be made of a plastic material, making the entire package recyclable, or the spring 50 can be metallic. If the spring 50 is metallic, the package 1 is still easily recyclable, since the metallic spring 50 is easily removed from the package by simply dislodging the actuator 6 and removing the spring 50. The package 1 of the present invention may also be made of a biodegradable plastic material, so that it has less of an environmental impact.

The method of using the device of the present invention is as follows. The container portion 2 is molded as an integral unit with upstanding wall 3 and retaining wall 10. Container portion 2 is inverted, and preferably inserted into a holding or restraining mechanism which interacts with shoulder 32 to restrain container portion 2 in an inverted position. Next, pump 12 is inserted into either the open end of lower end 16 or upper end including upstanding wall 3, so that the upper portion of pump 12 fits through retaining opening 11 until flange 13 abuts retaining wall 10. If retaining wall 10 contains an energy director 15, container portion 2 is sonically or ultrasonically excited so that energy director 15 welds retaining wall 10 and flange 13 in a sealing relation. Actuator 6 can then be inserted onto the outlet stem 40 of pump 12.

The container portion 2 thus assembled is shipped together with bottom portion 17 in an unassembled condition to a filling and assembly location. When it is desired to fill package 1, container portion 2 is again inverted, preferably by engaging shoulder 32 with a holding device. Container portion 2 is then filled with liquid product through open lower end 16. Bottom portion 17 is then placed on lower end 16. If bottom portion 17 contains an energy director 20, container portion 2 is sonically or ultrasonically excited so that energy director 20 welds bottom portion 17 and lower end 16 in a sealing relation. In the case of lower end 17 including angled tabs 30, bottom portion 17 is inserted onto lower end 16 until portion 31 snaps under angled tabs 30.

After bottom portion 17 is sealed to lower end 16, the package 1 can be labelled and shipped to an end user, or alternatively, package 1 can be labelled before the container portion 2 is shipped to the liquid product marketer. Upon receiving package 1, the customer breaks off tab 4, and then when dispensing is desired, rotates actuator 6 to the position shown in FIG. 5. Downward actuation of actuator 6 dispenses liquid product from package 1, through nozzle 9.

I claim:

1. A method of providing a dispensing container comprising the steps of:

providing a package comprising an open lower end and a retaining wall in an upper end, said retaining wall comprising a retaining opening, said lower end comprising a plurality of circumferentially spaced angled tabs;

providing a pump structure;

inserting said pump structure into said retaining opening;

filling said package with a fluid product through said open lower end;

providing a one-piece bottom portion comprising a retaining groove and a horizontal portion; and attaching said bottom portion to said lower end by inserting said lower end into said retaining groove until said plurality of angled tabs engage said horizontal portion.

2. The method of claim 1, further comprising the steps of:

providing a spray actuator; and inserting said spray actuator on said pump structure.

3. The method of claim 1, wherein:

said step of inserting said pump structure into said retaining opening comprises inserting said pump structure through said open lower end.

4. The method of claim 1, wherein:

said step of inserting said pump structure into said retaining opening comprises inserting said pump structure from a side of said retaining wall opposite said open lower end.

5. A dispensing package comprising:

an actuator portion comprising a nozzle:

an integrally formed container portion comprising:

an upstanding wall portion, a lower portion and a retaining wall, said lower portion containing an open lower end, said upstanding wall portion comprising a groove for retaining and sealing said nozzle on said actuator portion, wherein said upstanding wall portion further comprises a bead, said bead coacting with an outer surface of said actuator portion to provide an audible sound when said nozzle is retained and sealed in said groove;

a pump structure, a circumferential outer surface of said pump structure being formed to be retained in said retaining opening and sealed to said retaining wall; and a one-piece bottom portion, said bottom portion being formed separate from said container portion, said bottom portion being formed to be secured to said lower end and sealed to said lower end, whereby said container portion can be filled with a liquid product through said open lower end and said bottom portion sealed to said lower end to seal said liquid product within said container portion.

6. The dispensing package of claim 5, wherein:

said retaining wall further comprises a limit stop for preventing downward movement of an actuator portion when said nozzle is retained in said groove.

7. A dispensing package comprising:

an integrally formed container portion comprising:

a lower portion and a retaining wall, said lower portion comprising an open lower end, said lower end comprising a plurality of circumferentially spaced angled tabs, said retaining wall comprising a retaining opening;

a pump structure, a circumferential outer surface of said pump structure being formed to be retained in said retaining opening and sealed to said retaining wall; and a one-piece bottom portion, said bottom portion being formed separate from said container portion, said bottom portion comprising a retaining groove, said retaining groove being formed to receive said angled tabs to seal said bottom portion to said lower end, said angled tabs cooperating with a horizontal portion on said bottom portion, to thereby ensure that said bottom portion is secured horizontally to said container portion.

8. The dispensing package of claim 7, further comprising:

a spring mounted between said actuator portion and said retaining wall.

9. The dispensing package of claim 7, further comprising:

an actuator portion retained upon said pump structure.

10. The dispensing package of claim 7, further comprising:

an actuator portion retained upon said pump structure, and wherein said integrally formed container portion comprises an upstanding wall portion.

11. The dispensing package of claim 10, wherein:

said upstanding wall portion comprises a groove for retaining and sealing a nozzle on said actuator portion, said retaining wall further comprising a limit stop for preventing downward movement of said actuator portion when said nozzle is retained in said groove.

12. The dispensing package of claim 7, wherein: said integrally formed container portion comprises an upstanding wall portion.

13. The dispensing package of claim 12 wherein:

said upstanding wall portion comprises a removable tab covering a dispensing opening in said upstanding wall.

14. The dispensing package of claim 12, further comprising:

a shoulder on said package for supporting said package during an assembly operation and a filling operation.

15. The dispensing package of claim 12, further comprising:

an energy director for providing a seal between said retaining wall and said pump structure.

* * * * *